United States Patent
Curry et al.

(10) Patent No.: US 7,433,084 B2
(45) Date of Patent: **\*Oct. 7, 2008**

(54) DIGITAL DE-SCREENING TECHNIQUE FOR SCANNED DOCUMENTS

(75) Inventors: Donald J. Curry, Menlo Park, CA (US); Doron Kletter, San Mateo, CA (US); Asghar Nafarieh, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 963 days.

This patent is subject to a terminal disclaimer.

(21) Appl. No.: 10/612,064

(22) Filed: Jul. 1, 2003

(65) Prior Publication Data
US 2004/0051908 A1    Mar. 18, 2004

Related U.S. Application Data

(60) Provisional application No. 60/393,244, filed on Jul. 1, 2002.

(51) Int. Cl.
*G06T 5/00* (2006.01)
*H04N 1/409* (2006.01)

(52) U.S. Cl. .............. 358/3.08; 358/3.26; 358/533; 358/3.03; 382/260; 382/261; 382/264; 382/263; 382/254; 382/265; 382/274; 382/284

(58) Field of Classification Search .............. None
See application file for complete search history.

(56) References Cited

U.S. PATENT DOCUMENTS

| | | | |
|---|---|---|---|
| 4,849,914 A | | 7/1989 | Medioni et al. |
| 5,351,314 A | * | 9/1994 | Vaezi ........................ 382/264 |
| 5,384,648 A | * | 1/1995 | Seidner et al. ............. 358/534 |
| 5,392,137 A | * | 2/1995 | Okubo ....................... 358/462 |
| 5,515,452 A | | 5/1996 | Penkethman et al. |
| 5,583,659 A | | 12/1996 | Lee et al. |

(Continued)

FOREIGN PATENT DOCUMENTS

| | | |
|---|---|---|
| EP | 0 712 094 A2 | 5/1996 |
| EP | 0 806 864 A2 | 11/1997 |
| EP | 0 806864 A2 * | 11/1997 |
| EP | 1 006 716 A2 | 6/2000 |

OTHER PUBLICATIONS

U.S. Appl. No. 10/776,515, filed Feb. 12, 2004, Curry et al.

(Continued)

*Primary Examiner*—Twyler Lamb Haskins
*Assistant Examiner*—Pawandeep S Dhingra
(74) *Attorney, Agent, or Firm*—Oliff & Berridge, PLC

(57) ABSTRACT

A method and system for de-screening an image signal utilizing a bank of filters to provide several increasingly blurred versions of the original image signal is disclosed. At any given time, only two of these blurred versions are created, on a pixel-by-pixel basis. The outputs from the selected pair of blurred signals are then blended together to create a variable blending output that can vary smoothly from no blurring to maximum blurring in a smooth and continuous manner. In addition, the method provides the capability to enhance text and line art by using a variable un-sharp masking mechanism with independent post-blur sharpening control, and the capability to detect and enhance neutral (no-color) output pixels.

19 Claims, 8 Drawing Sheets

U.S. PATENT DOCUMENTS

| | | | | |
|---|---|---|---|---|
| 5,604,825 | A * | 2/1997 | Hirota et al. | 382/261 |
| 5,638,134 | A * | 6/1997 | Kameyama et al. | 348/607 |
| 5,745,596 | A | 4/1998 | Jefferson | |
| 5,900,953 | A | 5/1999 | Bottou et al. | |
| 6,058,214 | A | 5/2000 | Bottou et al. | |
| 6,115,502 | A * | 9/2000 | De Haan et al. | 382/260 |
| 6,222,945 | B1 * | 4/2001 | Cheung et al. | 382/260 |
| 6,324,305 | B1 | 11/2001 | Holladay et al. | |
| 6,343,154 | B1 | 1/2002 | Bottou et al. | |
| 6,360,025 | B1 * | 3/2002 | Florent | 382/261 |
| 6,400,844 | B1 | 6/2002 | Fan et al. | |
| 6,404,934 | B1 * | 6/2002 | Lee et al. | 382/260 |
| 6,430,318 | B1 * | 8/2002 | Florent et al. | 382/260 |
| 6,493,467 | B1 * | 12/2002 | Okuda et al. | 382/260 |
| 6,633,670 | B1 | 10/2003 | Matthews | |
| 6,725,247 | B2 * | 4/2004 | Acharya | 708/308 |
| 6,839,152 | B2 * | 1/2005 | Fan et al. | 358/3.08 |
| 6,947,178 | B2 * | 9/2005 | Kuo et al. | 358/3.08 |
| 7,106,478 | B2 * | 9/2006 | Takano | 358/3.26 |
| 2004/0032600 | A1 * | 2/2004 | Burns et al. | 358/1.9 |
| 2004/0051908 | A1 | 3/2004 | Curry et al. | |

OTHER PUBLICATIONS

U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.
U.S. Appl. No. 10/776,612, filed Feb. 12, 2004, Curry et al.
U.S. Appl. No. 10/187,499, filed Jul. 2002, Donald J. Curry et al.
U.S. Appl. No. 10/188,026, filed Jul. 2002, Donald J. Curry et al.
U.S. Appl. No. 10/188,157, filed Jul. 2002, Donald J. Curry et al.
U.S. Appl. No. 10/188,249, filed Jul. 2002, Donald J. Curry et al.
U.S. Appl. No. 10/188,277, filed Jul. 2002, Donald J. Curry et al.
U.S. Appl. No. 10/612,057, filed Jul. 2003, Donald J. Curry et al.
U.S. Appl. No. 10/612,062, filed Jul. 2003, Donald J. Curry et al.
U.S. Appl. No. 10/612,063, filed Jul. 2003, Donald J. Curry et al.
U.S. Appl. No. 10/612,084, filed Jul. 2003, Donald J. Curry et al.
U.S. Appl. No. 10/612,234, filed Jul. 2003, Donald J. Curry et al.
U.S. Appl. No. 10/612,246, filed Jul. 2003, Donald J. Curry et al.
U.S. Appl. No. 10/612,248, filed Jul. 2003, Donald J. Curry et al.
U.S. Appl. No. 10/612,250, filed Jul. 2003, Donald J. Curry et al.
U.S. Appl. No. 10/612,368, filed Jul. 2003, Donald J. Curry et al.
U.S. Appl. No. 10/612,461, filed Jul. 2003, Donald J. Curry et al.
U.S. Appl. No. 10/612,261, filed Jul. 2003, Donald J. Curry et al.
R. De Queiroz, "Compression of Compound Documents," *IEEE*, 1999.
Crow, F.C. "A Comparison of Antialiasing Techniques." IEEE Computer Graphics and Applicaions, IEEE, New York, NY. vol. 1, No. 1, Jan. 1981, pp. 40-43, 46.

* cited by examiner

*FIG. 2*
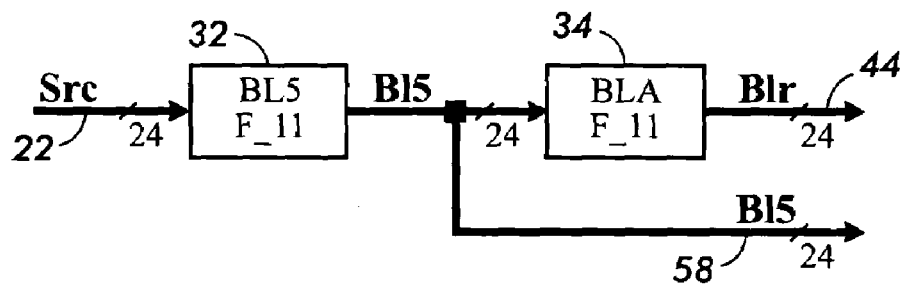
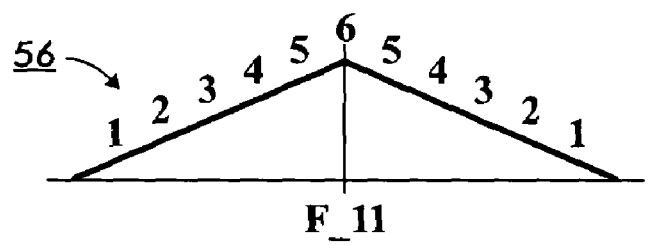
*FIG. 3*
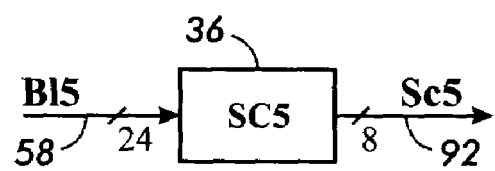
*FIG. 4*

| Bnk bit 7 | Bnk bit 6 | Bnk bit 5 | Bank Select |
|---|---|---|---|
| 0 | 0 | 0 | Src and Blr_1 |
| 0 | 0 | 1 | Blr_1 and Blr_2 |
| 0 | 1 | 0 | Blr_2 and Blr_3 |
| 0 | 1 | 1 | Blr_3 and Blr_4 |
| 1 | 0 | 0 | Blr_4 and Blr_5 |
| 1 | 0 | 1 | Blr_5 |
| 1 | 1 | 0 | INVALID |
| 1 | 1 | 1 | INVALID |

162

| Filter Index | Filter Width | Filter 1D Wt. | Filter 2D Wt. | Factor | Shift for 11 bit precision |
|---|---|---|---|---|---|
| 0 | 1 | 1 | 1 | 1 | <<3 |
| 1 | 3 | 4 | 16 | 1 | >>1 |
| 2 | 5 | 9 | 81 | 809 | >>13 |
| 3 | 7 | 16 | 256 | 1 | >>5 |
| 4 | 9 | 25 | 625 | 839 | >>16 |
| 5 | 11 | 36=9*4 | 1296=81*16 | 809 | >>17 |

DIGITAL DE-SCREENING TECHNIQUE FOR SCANNED DOCUMENTS

This application is based on a Provisional Patent Application No. 60/393,244 filed Jul. 1, 2002.

CROSS-REFERENCE TO RELATED APPLICATIONS

The present application is related to the following co-pending applications: Ser. No. 10/187,499 entitled "Digital De-Screening of Documents", Ser. No. 10/188,026 entitled "Control System for Digital De-Screening of Documents", Ser. No. 10/188,277 entitled "Dynamic Threshold System for Multiple Raster Content (MRC) Representation of Documents", Ser. No. 10/188,157 entitled "Separation System for Multiple Raster Content (MRC) Representation of Documents", and Serial No. 60/393,244 entitled "Segmentation Technique for Multiple Raster Content (MRC) TIFF and PDF all filed on Jul. 1, 2002 and all commonly assigned to the present assignee, the contents of which are herein incorporated by reference.

BACKGROUND OF THE INVENTION

1. Field of the Invention

The present invention relates generally to methods and systems for image processing, and more particularly to methods and systems for de-screening digitally scanned documents.

2. Description of Related Art

Almost all printed matter, except silver-halide photography, is printed using halftone screens. These halftone screens are traditionally optimized for the printing device, and may cause considerable halftone interference (visible large-area beating) and visible Moire patterns if not properly removed from the original scanned image. The successful removal of such screens without compromising text and line art quality is a fundamental key to quality document scanning and document segmentation and compression.

SUMMARY OF THE INVENTION

A method and a system for de-screening an image signal are disclosed. A filter bank filters an image signal and produces a set of filter output signals. The method and system utilizes this bank of filters to provide several increasingly blurred versions of the original signal. At any given time, only two of these blurred versions are created, on a pixel-by-pixel basis. The outputs from the selected pair of blurred signals are then blended together to create a variable blending output that can vary smoothly from no blurring to maximum blurring in a smooth and continuous manner. In addition, the method provides the capability to enhance text and line art by using a variable un-sharp masking mechanism with independent post-blur sharpening control, and the capability to detect and enhance neutral (no-color) output pixels.

BRIEF DESCRIPTION OF THE DRAWINGS

The features and advantages of the present invention will become apparent from the following detailed description of the present invention in which:

FIG. 2 illustrates filter units used to provide a set of blurred versions of an original color signal.

FIG. 3 illustrates a one-dimensional filter response.

FIG. 4 shows the input/output lines for the Sparse Contrast module.

DETAILED DESCRIPTION OF THE DRAWINGS

A new method and system are described for de-screening digitally scanned documents such that potential halftone interference and objectionable Moire patterns are eliminated or substantially reduced. The method objective is to selectively eliminate the halftone screens from the scanned input signal, while preserving or enhancing the sharp edge information of text or line objects. This is accomplished even in cases where the two types of information are not spatially separated (e.g., text in lint).

The improved technique utilizes a bank of filters to provide several increasingly blurred versions of the original signal. At any given time, only two of these blurred versions are created, on a pixel-by-pixel basis. The outputs from the selected pair of blurred signals are then blended together to create a variable blending output that can vary smoothly from no blurring to maximum blurring in a smooth and continuous manner.

In addition, the method provides the capability to enhance text and line art by using a variable un-sharp masking mechanism with independent post-blur sharpening control, and the capability to detect and enhance neutral (no-color) output pixels.

The method utilizes complex logic for determining how much to blur and/or sharpen individual pixels and for providing instantaneous enhancement control from one pixel to the next. The method eliminates the need for a second large-size contrast window. Also, the new halftone screen frequency and magnitude require significantly fewer operations.

The method of the present invention can be made fully programmable through the use of piecewise linear control functions and various threshold registers. The de-screening cutoff frequencies, degree of halftone screen removal, and choice of the amount of edge enhancement can all be adjusted and tuned for high-quality output. The present invention is applicable to any document-scanning product. One embodiment of the present invention was implemented in software and demonstrated to deliver excellent image quality across a wide range of screen frequencies and typography sizes.

Figure 1:
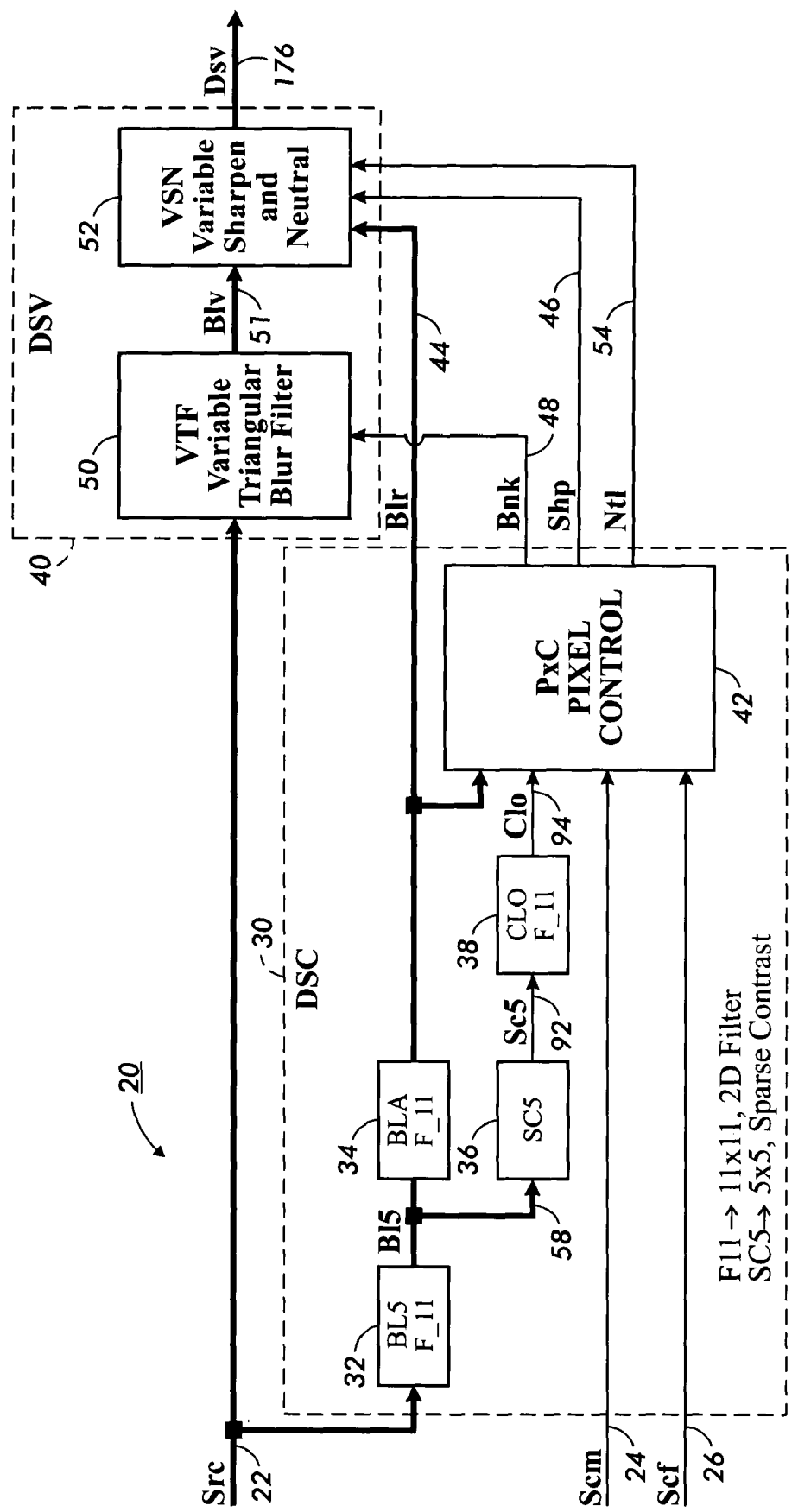
FIG. 1 shows a block diagram of the system of the present invention.

FIG. 1 shows the de-screener 20 of the system of the present invention comprising a DSC module 30 and a DSV module 40. The De-Screen Modules 30 and 40 respectively, are responsible for filtering out the original halftone patterns from a scanned image. Almost all printed matter, except silver-halide photography, is printed using halftone screens. These halftones are very specific to the printing device and may cause visible large-area beating and unacceptable Moiré patterns if not properly removed. The de-screening operation is even more critical for color documents, since these are typically printed with four or more color separations, and each separation often uses a slightly different screen.

It should be noted that the method and algorithms described below use the LAB color space. Alternatively, other color spaces such as YCbCr, RGB, etc. can be used where measures of luminance and neutrality are suitably modified. In many cases, linear YCbCr (before gamma correction) can produce better results than (non-linear) LAB.

The purpose of the de-screener system 20 is to detect incoming halftones in the input stream and selectively filter them out. The main objective is to filter out the halftones yet maintain the sharp edges of objects in line art on the page represented by the input image. At the same time, the de-screener system can optionally enhance text or line art objects with sharp edge definitions in order to not significantly compromise the quality of text and line art graphics. The two operations (filtering and enhancement) are tightly but independently controlled.

Referring once again to FIG. 1, DSC 30, the control module receives an input signal 22. The input signal 22 is a full-color (L, a, b) source signal Src 22. The DSC 30 control module then computes a blurred version of the Src 22 signal as well as 3 control signals. These 4 signals are then passed to the DSV 40 module, which modifies the Src image producing an enhanced output DSV 176. The main input signal Src 22 is a full-color (L, a, b) signal, with the chroma channels (a, b) normally sub-sampled by a factor of 2× in the fast scan direction. The output signal DSV 176 is also a full-color (L, a, b) signal, with similar representation and at the same rate as the input signal Src 22. The DSV signal 176, however, is an enhanced version of the input signal Src 22, which has been simultaneously blurred and sharpened, with much of the problematic halftone screens properly removed.

The control module DSC 30 relies on two additional input signals from a Screen Frequency Estimate Module SEM (not shown). These are two 8-bit monochrome signals that provide the estimated screen frequency Scf 26 and estimated screen magnitude Scm 24.

The main processing path of the De-Screen Module 20 occurs along the top portion of FIG. 1. The input signal Src 22 is passed through a Variable Triangular Blur Filter Unit VTF 50 to produce a blended signal Blv, which may then be further sharpened through the Variable Sharpening and Neutral Unit VSN 52, to produce the final de-screened output signal Dsv 176. All of these signals are full-color signals that are chrominance sub-sampled by 2× in the fast scan direction only.

Much of the De-Screen work is performed in the Variable Triangular Blur Filter Unit, VTF 50. The Variable Triangular Blur Filter Unit is composed of a Filter Bank unit that can, at any given time, produce two out of five subsequently filtered versions of the input signal, each with an increasingly larger filter span. The top three bits of a bank signal Bnk 48 select which pair of filters is to be used. The outputs of the selected filters are then blended together by the amount of blending specified in the next lower two bits of the bank signal Bnk 48. The selection of which filters to blend and by what amount can change on a pixel-by-pixel basis, depending on the content of the 8-bit bank signal Bnk 48 (the number of bits can change).

The full-color blended output Blv 51 from the Variable Triangular Blur Filter Unit VTF 50 is forwarded to the Variable Sharpening and Neutral Unit VSN 52. The VSN 52 Unit provides capabilities to further enhance the blended signal Blv 51. These capabilities include sharpening the Blv 51 signal and controlling its neutrality on the chroma axes. The unit includes a built-in un-sharp mask filter that uses a heavily blurred version Blr 44 of the source Src 22 signal as a reference signal. The amount of sharpening is controlled by the 8-bit signal Shp 46. In addition, a built-in chroma adjustment circuitry can force the output signal Dsv 176 to be neutral (a=b=128) (equal to zero) to be non-neutral or (b=+127) (equal to −1) depending on the content of an 8-bit control signal Ntl 54.

The left-hand side of FIG. 1, DSC 30, is responsible for generating the instantaneous pixel-by-pixel control signals. The inputs to this portion include the color input signal Src 22 as well as the two monochrome (8-bit) signals screen frequency Scf 26 and magnitude Scm 24 from the Screen Frequency Estimation Module SEM, as more fully described and disclosed in Applicant's pending application. The outputs from this section include the blurred color reference signal Blr 44 and the above three monochrome control signals: bank Bnk 48; sharpen Shp 46, and neutral Ntl 54. The operation of this portion of the De-Screen Module 30 is described below.

The first F_11 Filter Unit BL5 32 filters the input color signal Src 22 to create the blurred color signal Bl5 58. The Bl5 58 signal is then further filtered through the second F_11 Filter Unit BLA 34 to produce the super-blurred reference color signal Blr 44, which is used in the Pixel Control Module PxC 42. Both Filter units BL5 2 and BLA 34 apply a 2D separable and triangular filter of size (11×11). The details of this filter are given below.

The additional amount of filtering is necessary to ensure that Blr 44 is a stable and relatively noise-free signal. The Blr 44 signal is used in the Pixel Control Module PxC 42, as a reference signal for the un-sharp mask filter inside DSV 40, as well as in a Segmentation module SEG (not shown).

The color output from the first F_11 Filter Unit BL5 32 is also forwarded to the Sparse Contrast Unit SC5 36. The Sparse Contrast Module SC5 92 calculates the color contrast in a 5×5 window over the current pixel of interest. The resulting 8-bit monochrome contrast value 92 is further filtered through the third F_11 Filter Unit CLO 38, to produce the signal Clo 94. The filtered contrast signal Clo 94 is delivered to the Pixel Control module PxC 42.

As an implementation optimization, the CLO unit is optionally allowed to operate at ¼ the normal rate producing a ½ scaled version of Clo. The Clo signal is then used everywhere it is needed by doing simple nearest-neighbor 2× up scaling.

The Pixel Control module PxC 42 takes as inputs the blurred signal Blr 44, the filtered contrast value Clo 94, and the screen frequency Scf 26 and magnitude Scm 24 estimates from the Screen Frequency Estimate Module SEM. The Pixel Control module 42 produces an instantaneous decision, on a pixel-by-pixel basis, as to how much blurring is to be applied in the Variable Triangular Blur unit VTF 50. This decision is communicated to the Variable Triangular Blur unit VTF 50 for execution via the control signal Bnk 48. In addition, the Pixel Control module also generates additional enhancement controls in terms of the amount of sharpness Shp 46 and neutrality Ntl 54 for the Variable Sharpening and Neutral Unit VSN 52. The operation of the Pixel Control module PxC 42 is further detailed below.

The blurring filter arrangement is shown in FIG. 2. Two identical 11×11 filter units BL5 32 and BLA 34 are used to provide a set of blurred versions of the original color signal Src 22. The size of these filters is proportional to the inverse lowest halftone frequency that is to be detected. Since the current design is targeted to address up to 600 dpi scanning, it is not possible to significantly reduce the size of the these filters much beyond their current dimensions.

The input signal to each filter unit is a full-color signal, where the chroma channels are normally sub-sampled by a factor of two in the fast scan direction only. The 24-bit input signal Src 22 is fed to the first filter unit BL5 32 to produce the full-color filtered output labeled Bl5 58. The BL5 32 signal is then fed to the second Filter Unit BLA 34 to produce the full-color filtered, super-blurred output Blr 44. Both Filter Units operate at the full input data rate, each producing an independent full-color filtered output. Since each filter covers 11×11=121 input pixels, the filter units BL5 32 and BLA 34 are quite compute-intensive. For this reason the filter coefficients have been restricted to simple integers in order to eliminate the need for a large number of multipliers.

The two Filter Units BL5 32 and BLA 34 are identical. Each Unit is composed of an 11×11 2D FIR filter that is symmetric and separable in shape. A 1-D discrete filter response 56 is shown in FIG. 3. Each filter has a symmetric triangular shape, with integer coefficients. Since the filters are separable, it is more efficient to implement them in two 1D orthogonal steps.

In addition, each one of the Filter Units BL5 32 and BLA 34 applies independent 11×11 filtering on each one of the (L, a, b) color components at its input. However, since normally every two subsequent pixels have the same chroma (a, b) values, the chroma filters can be simplified as will be more fully described below. The 1D luminance filter shape is given by equation (1) as:

$$F_{L\_11} = \frac{1}{36}(1, 2, 3, 4, 5, 6, 5, 4, 3, 2, 1) \quad (1)$$

The overall 2-D response of the luminance F__11 filter is given by equation (2) as:

$$F\_11 = \frac{1}{1296}\begin{bmatrix}1\\2\\3\\4\\5\\6\\5\\4\\3\\2\\1\end{bmatrix} * (1, 2, 3, 4, 5, 6, 5, 4, 3, 2, 1) \quad (2)$$

Different implementations may chose to either normalize each pass back to 8 bits using:

1/36=455/2^14 (using a rounding right shift)

or normalize the final pass only using:

1/36*1/36=809/2^20 (using a rounding right shift).

The brute force method for filtering chroma subsampled images is to first expand the pixels to the same resolution as the luminance, filter using the same weights as the luminance, then average the results of adjacent chroma pairs in x to return to a X chroma subsampled representation. This method can be simplified by knowing that the source and destination chroma pixels are subsampled in X.

For instance, the chrominance filter can be implemented as two alternating filters as shown in equations (3) and (4):

$$F_{AB\_11} = \frac{1}{36}(1, x, 5, x, 9, x, 11, x, 7, x, 3) \text{ for even pixel} \quad (3)$$

and $$F_{AB\_11} = \frac{1}{36}(3, x, 7, x, 11, x, 9, x, 5, x, 1) \text{ for odd pixel} \quad (4)$$

where x=0 represents the location of unused pixels not involved in the current filtering operation. The two chroma filters alternate every other pixel.

Normally, the output chroma is also subsampled in the same way as the input chroma. Therefore the chroma value for both pixels would be the average of the odd and even cases. This can also be computed in one step using a 12 wide filter with weights: {1,3,5,7,9,11,11,9,7,5,3,1} and a normalizing value of 1/(36*2).

One approach to increase the filter efficiency is to increase the vertical context and process many lines in parallel. For example, the largest filter F__11 requires 11 lines of input to produce a single line of output (an efficiency of ~9%). The filter efficiency is improved with more input lines. For example, if the number of input lines is increased from 11 to 20, the filter could now generate 8 lines of output, and the efficiency goes up to 40%=8/20. However, this requires larger input buffer to hold more lines, and this implies pipeline delay.

The Sparse Contrast Unit SC5 36 measures the amount of contrast of the first blurred signal Bl5 58 from the output of the Filter Unit BL5 32. The Bl5 58 signal itself is a blurred version of the full-color input signal Src 22 that was generated by passing Src 22 through the F__11 filter BL5 32. The BL5 32 input is a 24-bit (L,a,b) signal with a, b sub-sampled by a factor of 2× in the fast scan direction. As shown in FIG. 4, the Sparse Contrast Unit SC5 36 produces a monochrome output Sc5 92 (single channel), which is normalized to fit the 8-bit output range. The Sparse Contrast module 36 utilizes three 5×5 windows, one per color component, centered on the current pixel of interest.

Figure 5:
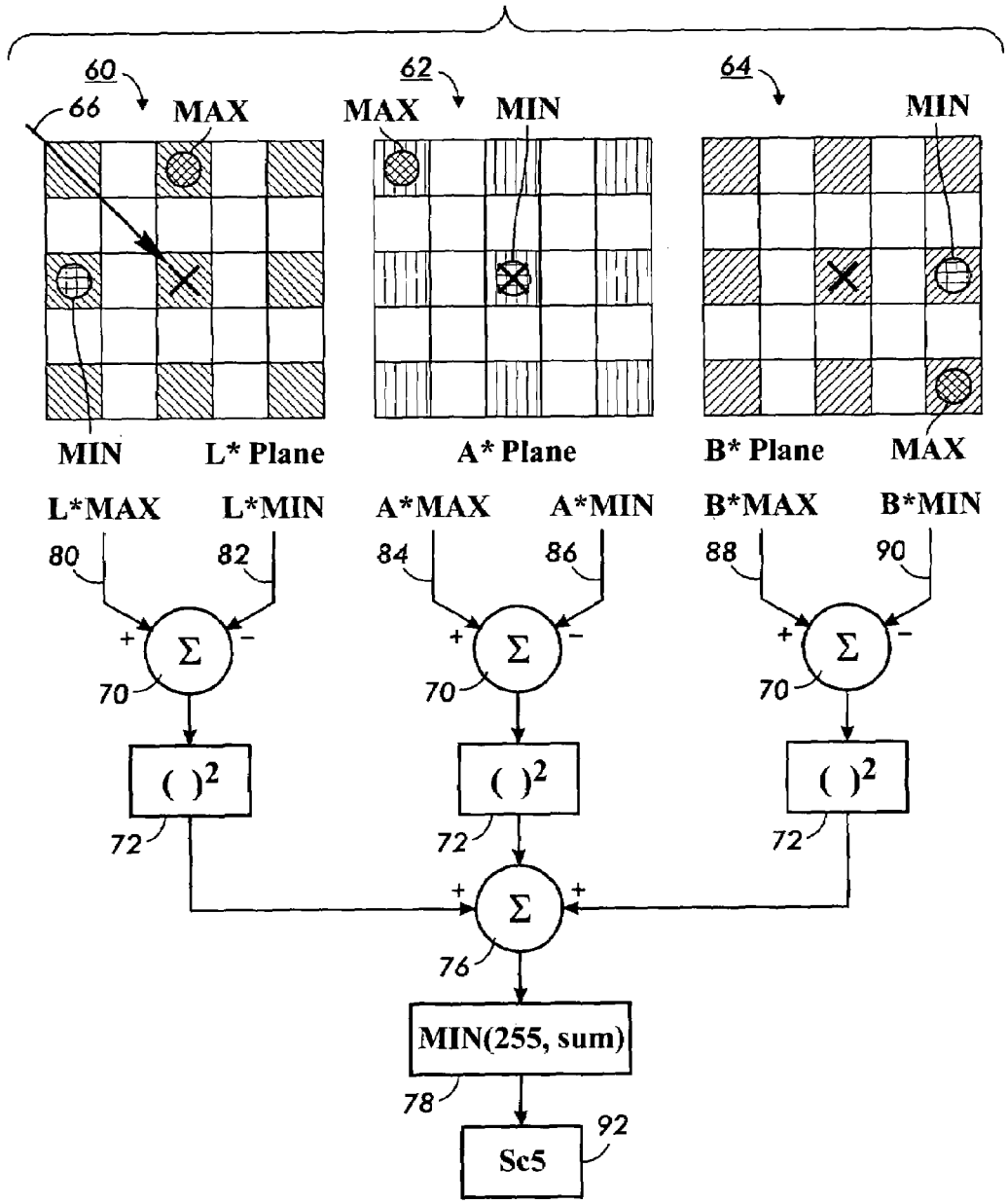
FIG. 5 illustrates a block diagram for the Sparse Contrast module of FIG. 4.

A block diagram of the SC5 module is shown in FIG. 5. The operation of the contrast module is as following: For each pixel location, the content of the 5×5 windows is searched for the minimum and maximum values. The search is done independently for each color component.

Figure 6:
FIG. 6 illustrates the CLO filter.

In order to reduce the number of overall computations, the search is performed on every other pixel location 66 as shown in FIG. 6. The net savings from the sparse search is 64% less computations since only 9 pixels out of 25 must be compared relative to a full window search.

The combined contrast measure is defined as the sum 70 of squared contributions 72 from each color component L(80, 82), A(84, 86), and B(88,90) shown in equations (5), (6) and (7):

$$\Delta L = L_{max} - L_{min} \quad (5)$$

$$\Delta A = A_{max} - A_{min} \quad (6)$$

$$\Delta B = B_{max} - B_{min} \quad (7)$$

Where ($L_{max}$, $L_{min}$) 60, ($A_{max}$, $A_{min}$) 62, and ($B_{max}$, $B_{min}$) 64 are the independent minimum and maximum values found within the sparse 5×5 window of the respective color component, and the output value 76 is defined in equation (8) to be:

$$\Delta = (\Delta L^2 + \Delta A^2 + \Delta B^2) \quad (8)$$

Additional logic is used to limit the value of the result to the range of 8-bit 78 in case the value of Δ becomes too large.

Note that the output contrast value is a sum-of-squares measure, much like variance. It measures the largest squared contrast inside the sparse 5×5 windows. It does not matter if there is more than one pixel with the same maximum or minimum values inside the window—the contrast would still be the same. Likewise, if a certain color component is constant over the window, its maximum value would be identical to its minimum, and the contrast contribution would be zero.

The CLO F_11 38 filter is used to apply further filtering on Sc5 92 image from the Sparse Contrast Unit SC5 36. A large amount of filtering is required in order to obtain a stable contrast output signal Clo 94. For this reason, a large filter size of F_11 is used for CLO 38 as shown in FIG. 6.

The CLO 38 F_11 filter takes as input the 8-bit output from Sparse Contrast Unit SC5 92. It produces a filtered output Clo 94 that is limited to fit the 8-bit range. The type of F_11 filter used is identical to the filters used in the filter Units BL5 32 and BLA 34 discussed above. The principle difference between this unit and the (BL5, BLA) units is that in this case the filter only operates on a single 8-bit gray component (as opposed to the 3-channel full-color LAB filters in BL5 and BLA).

Figure 7:
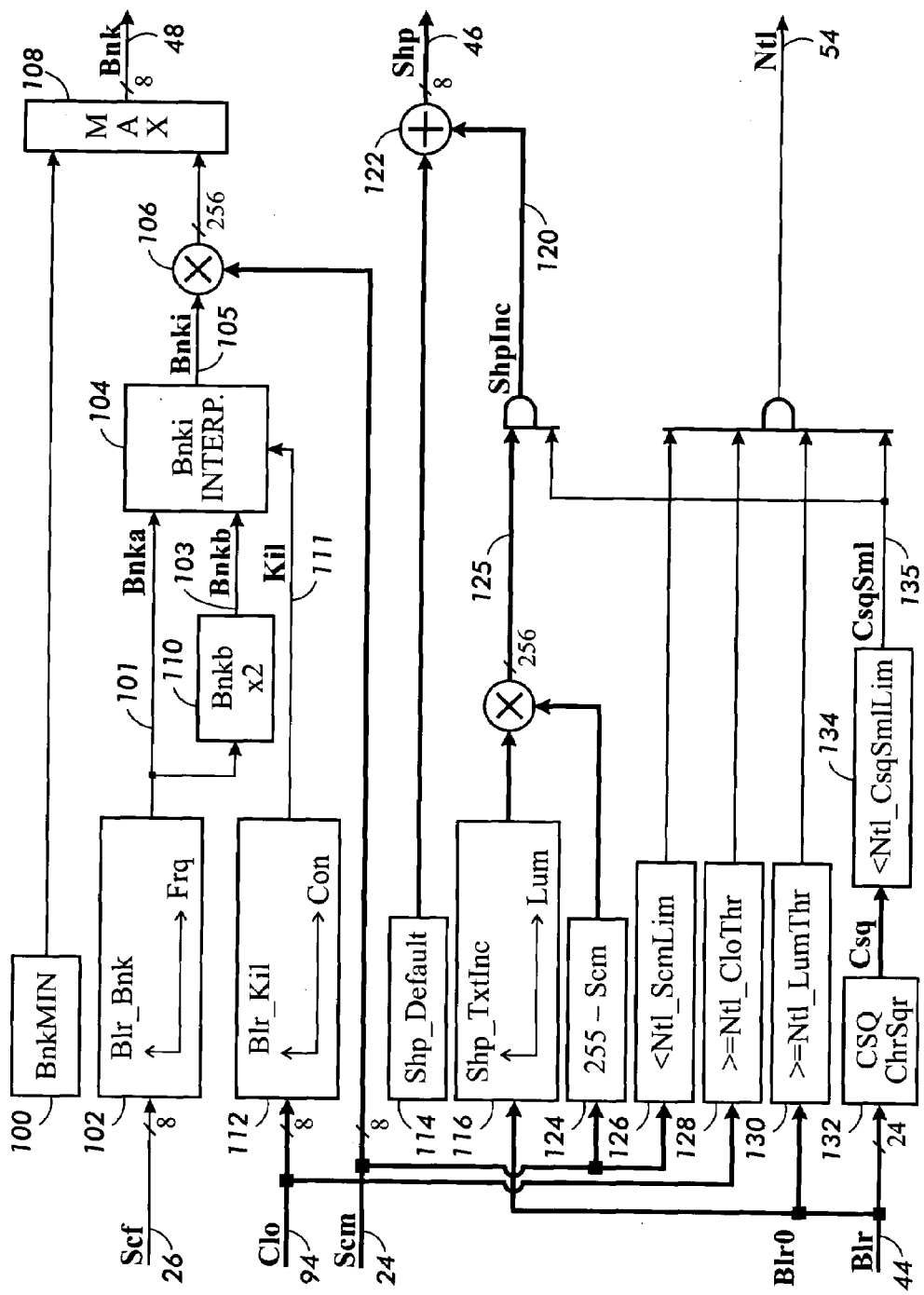
FIG. 7 shows a block diagram of the Pixel Control module.

Referring now to FIG. 7, there is shown a block diagram of the Pixel Control module 42. The Pixel Control module PxC 42 takes as inputs the blurred Src 22 signal Blr 44, the contrast value Clo 94, and the frequency estimate Scf 26 and magnitude Scm 24 values from the Screen Frequency Estimate Module SEM. The Clo 94, Scf 26, and Scm 24 are all 8-bit quantities, and only the blur signal Blr 44 is a full-color (L, a, b) signal.

The Pixel Control module 42 produces an instantaneous decision, on a pixel by pixel basis, as to which pair of filter outputs of the Variable Triangular Blur Filter VTF 50 is to be blended together and by how much. This decision is communicated to the Variable Triangular Blur Filter VTF 50 via the bank control signal Bnk 48. The Bnk 48 output is an 8-bit signal whose top three most significant bits select the base filter, and the two next significant bits provide the amount of blending to apply between this filter output and the subsequent (one size larger) one. The actual blending operation is implemented inside the Variable Triangular Blur Filter VTF 50 using full-color linear interpolation.

In addition, the Pixel Control module 42 also generates additional enhancement controls in terms of the sharpness Shp and pixel neutrality Ntl. The 8-bit signals Ntl 54 and Shp 46 are forwarded to and executed in the Variable Sharpen and Neutral Unit VSN 52.

The Pixel Control module 42 applies two programmable piecewise linear configuration functions: BnkVsFrq 102 and KilVsCon 112 producing the outputs: Bnka 101 and Kill 111. In general, the piecewise linear functions map 8-bits of input to 8-bits of output, and could be implemented using a full 256-entry lookup table. Although BnkVsFrq 102 is relatively complex, these functions (and others found in other modules) are typically quite simple usually involving only two significant points. These can be approximated by y=Ax+B where A is a low precision constant multiplier which can be implemented as a few add/sub operations.

As can be seen in the upper most part of FIG. 7, the intermediate Bnka 101 signal is generated by passing the 8-bit input screen frequency estimate signal Scf 26 through the top piecewise linear function BnkVsFrq 102 unit Bnka 101. The intermediate Bnka 101 signal is multiplied by 2 in the Bnkb unit producing Bnkb 103. Both Bnka 101 and Bnkb 103 must be clamped between 0 and 160.

A linear interpolation unit Bnki 104 is then used to blend Bnkb 103 and Bnka 101 together, producing the Bnki 105 output. The amount of blending is determined by the control signal Kill 111, which is generated from CLO 94 via the piecewise linear function KilVsCon 112*t*. The 8-bit blended output is then multiplied 106 with the 8-bit input signal Scm and the resulting output divided by 256 108 clamped with BnkMin 100 as a minimum, becomes the Bnk 48 control. A non zero BnkMin 100 is used for noisy scanners or when reduction scaling is required later on, maybe in the pipeline.

In the lower portion of FIG. 7, the blurred chrominance channels are sent to CSQ, which produces the chrominance squared signal Csq 132. Csq 132 is just the clamped sum of the squared chrominance components of Blr 44:

$$Csq = \min(255, (Blr_A)^2 + (Blr_B)^2) \qquad (9)$$

Csq 133 is then compared to the limit Ntl_CsqSmlLim 134 producing the signal CsqSml 135, which indicates when Csq 133 is small. CsqSml 135 is then used as an input to the gates producing the two outputs Ntl 54 and ShpInc 120.

As shown in FIG. 7, the other inputs to the NTL 54 gate are:
Scm<Ntl_ScmLim (true when Scm small) 126
Clo>=Ntl_CloThr (true when Clo not small) 128
Blr0>=Ntl_LumThr (true when blurred luminance not small) 130

The exported Ntl 54 output will be used in a subsequent stage VSN 52 to neutralize pixels by setting the A and B sample values to 128, (equal to 0), or an array from 128 (non-zero) as described below.

The other input to the gate producing ShpInc 120 is the product 122 of Scm 24 inverted and the Shp_TxtIncVsLum 116 piece-wise-linear function divided by 256. For implementation reasons, Shp_TxtIncVsLum 116 is constrained to be a sawtooth shaped function (example below). The sharpness increment value ShpInc 120 is added 122 to the default sharp value Shp_Default 114 producing the sharpness control signal Shp 46.

Figure 8:
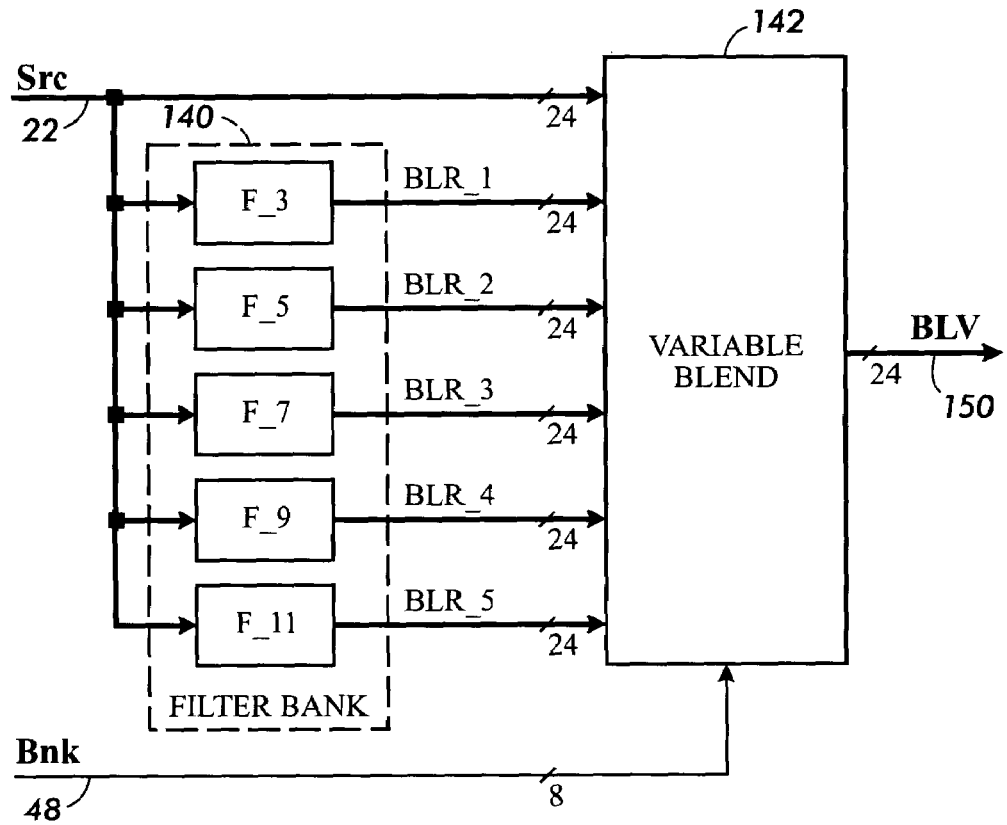
FIG. 8 shows a block diagram of the Variable Triangular Blur Filter VTF.

FIG. 8 shows a block diagram of the Variable Triangular Blur Filter VTF 50. The Variable Triangular Blur module VTF 50 is responsible for applying the main De-Screen operation by blurring the color input signal Src 22 to remove the original halftone screen patterns. The amount of blurring is modified on a pixel-by-pixel basis. Although the Variable Triangular Blur module VTF 50 is made up of several fixed triangular blurring filters. The outputs from subsequent filters are blended together to generate a variable blurred signal that can smoothly vary from the original Src 22 signal to the output of the largest, most heavily blurred F_11 filter.

The inputs to the Variable Triangular Blur Filter VTF 50 include the full-color Lab source signal Src 22 and the monochrome 8-bit bank control signal Bnk 48. The output from the Variable Triangular Blur Filter is the full-color output Blv 150, which is a blurred and blended version of the input Src 22. The de-screened output Blv 150 is delivered to the Variable Sharpen and Neutral Unit VSN 142 for further processing and enhancement.

Figure 9:
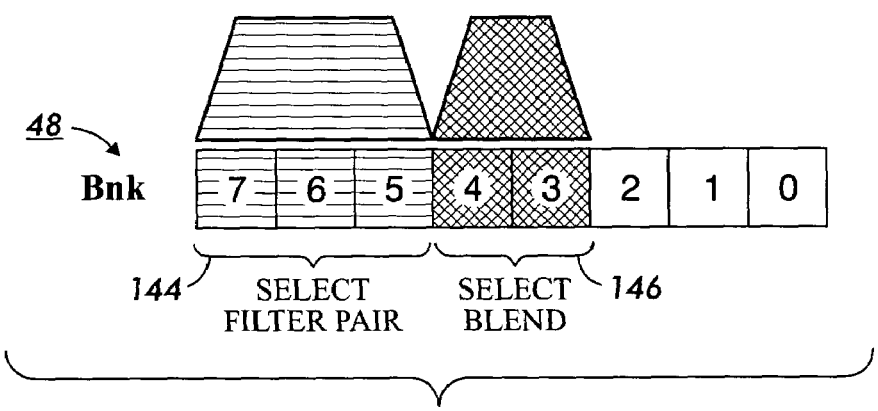
FIG. 9 illustrates the output of the Filter Bank.

The Variable Triangular Blur Filter VTF is made up of two units: the Filter Bank unit 140 and the Variable Blend unit 142. The Filter Bank unit is the most computationally intensive in the de-screener unit. As shown in FIG. 9, the Filter Bank unit 140 provides five increasingly blurred versions of the original signal by creating a select filter pair 144 and select blend 146.

The outputs from a selected pair 144, 146 of blurred signals are blended together to create a variable blended output that can smoothly transition from no blurring (output=input Src)

to maximum blurring in a continuous manner. The selection of filters to use and the amount of blending are communicated from the Pixel Control module PxC 42 via the bank control Bnk 48 signal. The top three bits select the bank pair, and the next two define the amount of blending to apply. The use of these bits is captured in Tables 160 and 162 shown in FIGS. 11 and 12.

Figures 10, 11:
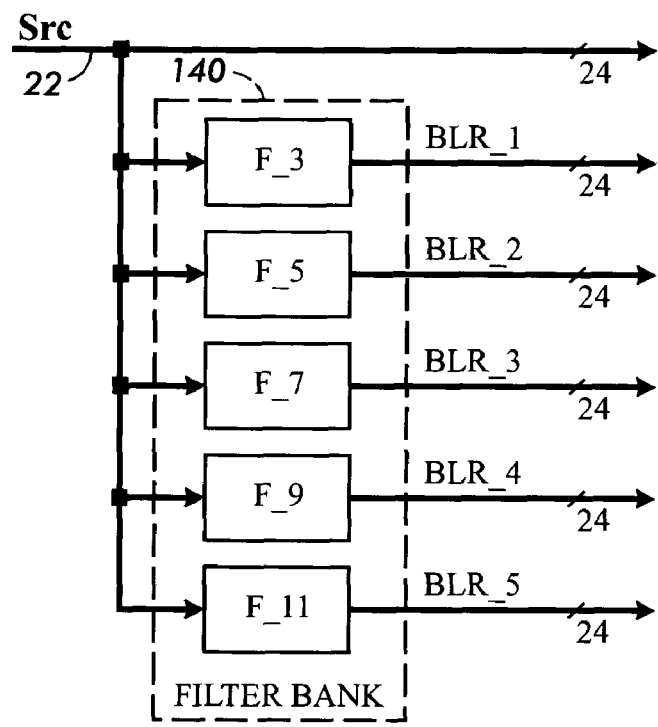
FIG. 10 shows a block diagram of the Filter Bank module.
FIG. 11 is a table showing subsequent filter pairs based on the top three Bank bits.

The Filter Bank 140 is composed of five independent full-color triangular filters: F_3, F_5, F_7, F_9, and F_11. The Filter Bank 140 arrangement is shown in FIG. 10. The size of the largest filter in the Filter Bank 140 is determined by the lowest halftone frequency that is to be detected. Since the current design is targeted to address up to 600 dpi scanning, it is not possible to significantly reduce the size of the largest filter much beyond its current dimensions.

The input signal to each one of the filters is the full-color Lab source signal Src 22, where the chroma channels (a, b) are normally sub-sampled by a factor of two in the fast scan direction only. Whatever the pair of filters that is selected, those filters are operating at the full input Src 22 data rate, each producing its own independent full-color blurred output, labeled BLR_n, with n being the filter index.

Figures 12, 13:
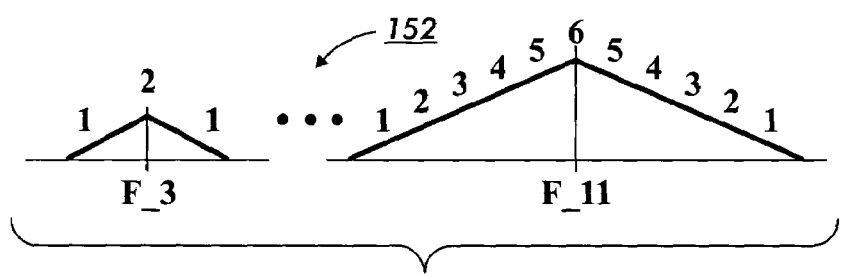
FIG. 12 is a table displaying normalization factors and shifts.
FIG. 13 illustrates one dimensional filter responses of the various Filter Bank filters.

Each filter unit (out of the two that are currently selected) is processing the input data independently for each of the (YCC) color components. Each filter has a symmetric, triangular and separable shape, with integer coefficients. The 1-D discrete response of the filters 152 is shown in FIG. 13. Bits 4, and 5 of the Bnk signal specify the blending factor Blend 146, essentially the fractional bank value. The output Blv 150 is given as:

$$Blv=(Blr\_n*(4-Blend)+Blend*(Blr\_n+1)+2)/4 \quad (10)$$

The added 2 provides nearest integer rounding. Each filter output is first only normalized back to an 11-bit range (without rounding). That is, each result is left scaled up by a factor of 8. This preserves 3 extra bits of precision for the blending operation. Equation (11) describes the final blending step in which rounding and the extra factors of 8 are taken into account as follows:

$$Blv=(8\times Blr\_n*(4-Blend)+Blend*(8\times Blr\_n+1)+16)/32 \quad (11)$$

The normalization factors and shifts, which leave the intermediate results scaled up by 8, are shown in the Table 162 shown in FIG. 12. Filter index 0 (the unfiltered Src) must be left shifted 3 (multiplied by 8). All other shifts are right shifts.

In general, when rounding is called for, it is applied by adding in half the divisor prior to performing a shift. Since right shift, performed on 2's complement coded binary numbers is the equivalent of floor (numerator/2^shift), adding half the divisor causes nearest integer rounding for both signed and unsigned numerators. Also it is best to only round once during a final scaling step.

The overall 2-D response of the smallest filter, F_3, is given in equation (12) as:

$$F\_3 = \frac{1}{16}\begin{bmatrix}1\\2\\1\end{bmatrix}*(1,2,1) = \frac{1}{16}\begin{bmatrix}1 & 2 & 1\\2 & 4 & 2\\1 & 2 & 1\end{bmatrix} \quad (12)$$

The larger filters are similarly described. The F_11 equation is identical to that in (12). Since these filters are separable, it is best to implement them in two orthogonal 1D steps. For a more efficient implementation of the first step, the larger filters can share partial results with the smaller filter rather than calculate them separately. For example, each of the 1 D un-normalized triangular sums $Tri_N$ can be computed using the following loop:

N=0
$Sum_0$=pixel(0)
$Tri_0$=$Sum_0$
For (N in 0 to 4)
$Sum_{N+1}$=$Sum_N$+pixel(-N-1)+pixel(N+1)
$Tri_{N+1}$=$Tri_N$+$Sum_{N+1}$ Where pixel index zero is the current pixel of interest, and positive index axis is in normal raster order scan. One approach to increase the filter efficiency is to increase the vertical context and process many lines in parallel. For example, the largest filter F_11 requires 11 lines of input to produce a single line of output (an efficiency of ~9%). The filter efficiency is improved with more input lines. For example, if the number of input lines is increased from 11 to 20, the filter could now generate 8 lines of output, and the efficiency goes up to 40%=8/20. This requires larger input buffer to hold more lines and implies a larger pipeline delay.

Referring back to FIG. 1, the Variable Sharpening and Neutral unit VSN 52 is responsible for applying additional sharpening enhancement and adjusting the output chroma. The inputs to the VSN 52 unit include the full-color blended input signal Blv 51, the full-color reference super-blurred signal Blr, and the two 8-bit control signal Shp and Ntl for the sharpness and neutral, respectively. The output of the Variable Sharpening and Neutral unit VSN is the full-color final result Dsv of the De-Screen DSV Module.

Figure 14:
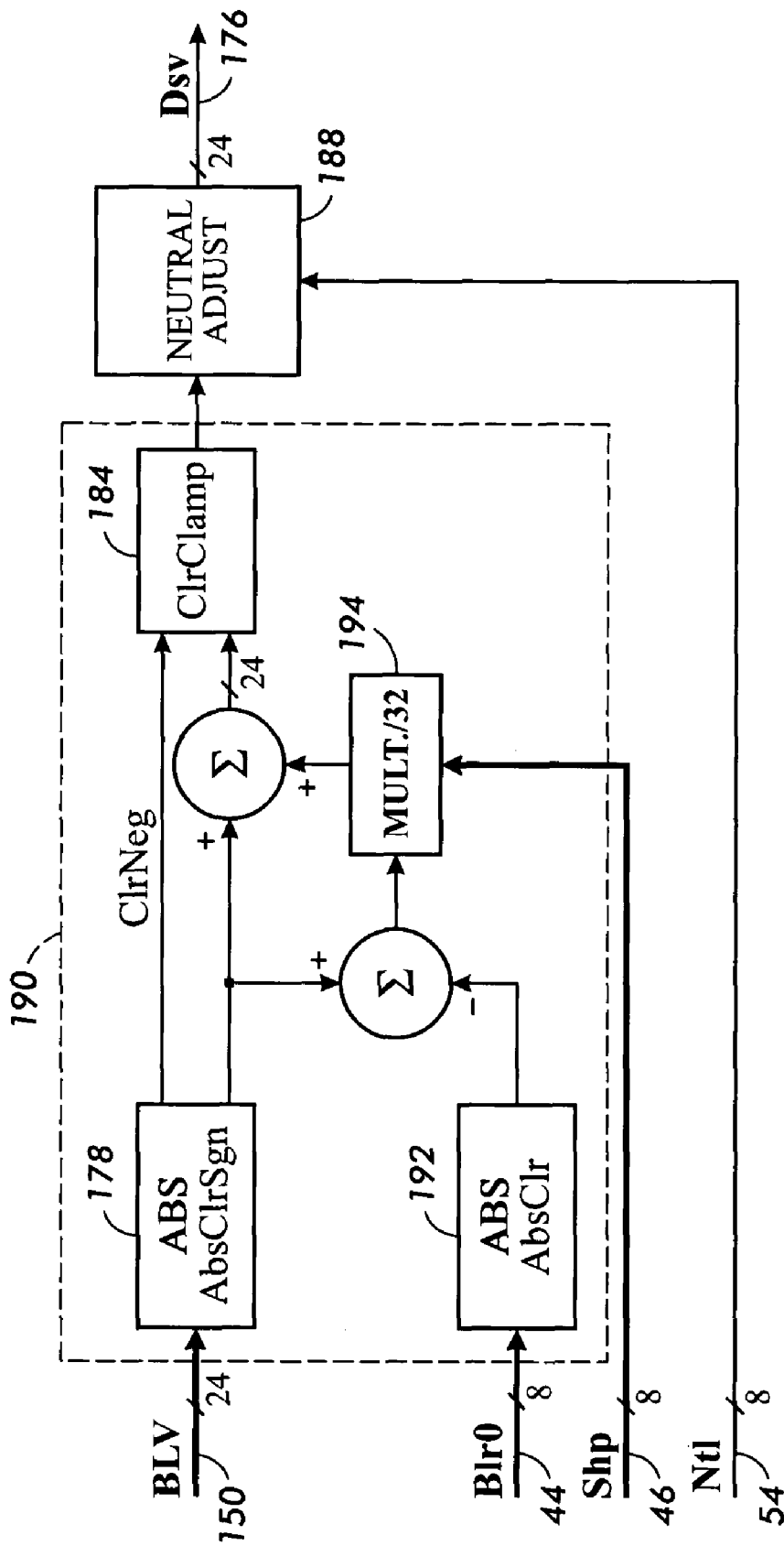
FIG. 14 shows a block diagram of the Variable Sharpen and Neutral Unit VSN.

The block diagram of the Variable Sharpening and Neutral unit is shown in FIG. 14. The Variable Sharpening and Neutral unit VSN is composed of two parts: the first is composed of the elements of an un-sharp mask sharpening filter. This is followed by the Neutral Adjust unit.

The blended output Blv from the Variable Triangular Blur Filter VTF is passed through the AbsClrSgn unit, which only modifies the color, channels. For the chrominance channels, it outputs the absolute value of the signed chrominance value (abs(clr-128)). AbsClrSgn also outputs the signal ClrNeg, which records the signs of the 2 chrominance-components (negative in the range of 1 . . . 127, including end-points) before the operation was performed. The AbsClr unit on the Blr input performs the same absolute value function on the chrominance components of the Blr image.

The operation of the Un-sharp Mask filter is achieved by subtracting a low-frequency version of the source input—the super blurred signal Blr—from the blended output Blv. The difference is then scaled by some factor that is determined by the 8-bit Shp signal supplied by the PxC module, and then added back to the blended output. Since the Un-sharp Mask filter subtracted some portion of the low frequency content, the difference contains more of the high-frequency content. By adding more of the high-frequency content back to the original input Blv, the net result is to enhance image and sharpen it. The Shp signal is interpreted as a fixed-point 1.5 number, such that 32 is defined as the sharpening factor 1.0. The un-sharp Mask filter is independently applied to each of the three (L, a, b) color components of Blv.

The raw enhanced image is passed to the ClrClamp unit, which limits the enhancement possible in the chrominance channels as a function of the raw enhanced luminance signal. First the raw enhanced chrominance values, which had been constrained to be 0 . . . 128 before sharpening are clamped between 0 and 127. The primarily prevents negative swings which would translate to a chrominance sign change. Next this chrominance magnitude is reduced by the amount of luminance overshoot that was measured. Luminance overshoot uses the configuration parameter ClrLumOvrThr as a reference to identify pixels where the luminance signal is being driven very bright. The degree of this overshoot is used to reduce the magnitude of the sharpened chrominance. Finally the sharpened chrominance magnitude is converted back to it's normal 8 bit coded value using the ClrNeg bit to determine the original chrominance sign. The Luminance channel is simply clamped between 0 and 255.

clampedChrom=max(0, min(127, rawEnhChrom))
overShoot=max(0, rawEnhancedLum−ClrLumOvrThr)
chromMag=max(0, clampedChrom−overshoot)

The whole process of chrominance sharpening can be disabled by clearing the ClrEnable configuration parameter. The remaining clamp unit simply limits the sharpening luminance between 0 and 255. The current plan is to assume Shp_ClrEn is false and use this simpler form of FIG. 1.6.2.

Finally, the Neutral Adjustment Unit controls the chroma components (A, B) values of the final output Dsv. If the Ntl_Enable configuration parameter is true, then the neutral control Ntl 54 supplied by PxC will force the chroma components to zero by setting the output chroma values to A=B=128. Also, if Ntl_EnsureNonNtl is enabled, then if the Ntl control is false but the pixel chroma components after sharpening are both 128, one of its chroma components (B) is forced away from zero by arbitrary setting it to 127 (equal to −1).

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for de-screening an image signal, the method comprising the operations of:
   (a) determining a control signal to select a pair of filters from a bank of filters;
   (b) selecting a pair of filters from a bank of filters using the determined control signal;
   (c) filtering the image signal using the selected pair of filters to produce a select pair of filter output signals;
   (d) generating at least one first control signal based on the image signal using a control module; and
   (e) dynamically blending the selected pair of filter output signals in accordance with the first control signal to produce a de-screened output signal, using a blend module;
   wherein operation (c) comprises the operations of:
      (1) receiving, via a contrast module, a filter output signal from one of the filters having larger filter spans, and producing a contrast signal;
      (2) receiving, via a screen estimate module, the image signal and producing an estimated frequency signal and a estimated frequency and magnitude signal; and
      (3) receiving, via a pixel control module, the contrast signal from the contrast module and the estimated frequency and magnitude signal from the screen estimate module, and producing the first control signal, the first control signal including information regarding which of the filter output signals are to be blended and the proportion of blending.

2. The method of claim 1 wherein, in operation (a), the bank of filters comprises two-dimensional filters, each of the two-dimensional filters being separable into two one-dimensional filters.

3. The method of claim 2 wherein each of the one-dimensional filters has a symmetric triangular shape with integer coefficients.

4. The method of claim 3 wherein some of the one-dimensional filters has a total weight equal to a power-of-2 number, the total weight being the sum of respective coefficients.

5. The method of claim 1 wherein, in operation (a), the bank of filters comprises lowpass filters having different cut-off frequencies to facilitate reduction of different halftone screen frequencies occurring within a predetermined range.

6. The method of claim 1 wherein, in operation (a), a number of filters having different filter spans and cascaded in series with one of the filters having a large filter span in the array of filters to produce a super lowpass signal having lowest cutoff frequency.

7. The method of claim 1 wherein operation (d) comprises:
   receiving, via an interpolation unit included in the blend module, the filter output signals and the first control signal;
   blending two signals selected from the filter output signals in accordance with the first control signal, via the interpolation unit; and
   producing a blended output signal.

8. The method of claim 7 wherein operation (d) further comprises:
   receiving, via chrominance processing and un-sharped masked filter included in the blend module, the blended output signal from the interpolation unit and a second control signal from the control module;
   filtering the blended output signal in accordance with the second control signal; and
   producing a sharpened output signal.

9. The method of claim 8 wherein operation (d) further comprises:
   receiving, via a chroma control unit included in the blend module, the sharpened output signal from the unmask sharp filter and a third control signal from the control module;
   adjusting chroma components included in the image signal in accordance with the third control signal; and
   producing the de-screened output signal.

10. A system for de-screening an image signal, the system comprising:
   (a) a control module receiving the image signal and generating at least one first control signal;
   (b) a pair of filters selected in accordance with the first control signal from a bank of filters filtering the image signal and producing a select set of filter output signals;
   (c) a blend module dynamically blending the filter output signals in accordance with the first control signal to produce a de-screened output signal;
   (d) a contrast module for receiving a filter output signal from one of the filters having larger filter spans, and producing a contrast signal;
   (e) a screen estimate module for receiving the image signal and producing an estimated frequency signal and a estimated frequency and magnitude signal; and
   (f) a pixel control module for receiving the contrast signal from the contrast module and the estimated frequency and magnitude signal from the screen estimate module, and producing the first control signal, the first control signal including information regarding which of the filter output signals are to be blended and the proportion of blending.

11. The system of claim 10 wherein the bank of filters comprises two-dimensional filters, each of the two-dimensional filters being separable into two one-dimensional filters.

12. The system of claim 11 wherein each of the one-dimensional filters has a symmetric triangular shape with integer coefficients.

13. The system of claim 12 wherein some of the one-dimensional filters has a total weight equal to a power-of-2 number, the total weight being the sum of respective coefficients.

14. The system of claim 10 wherein the bank of filters comprises lowpass filters having different cutoff frequencies to facilitate reduction of different halftone screen frequencies occurring within a predetermined range.

15. The system of claim 10 wherein the bank of filters includes an array of filters having different filter spans and an extra filter cascaded in series with one of the filters having a large filter span in the array of filters to produce a super lowpass signal having lowest cutoff frequency.

16. An article of manufacture comprising:
 a machine usable medium having program code embedded therein, the program code comprising instructions that cause a machine to perform the method of claim 1.

17. The article according to claim 16 wherein the pair of filters comprises two-dimensional filters, each of the two-dimensional filters being separable into two one-dimensional filters.

18. The article according to claim 17 wherein each of the one-dimensional filters has a symmetric triangular shape with integer coefficients.

19. The article according to claim 18 wherein some of the one-dimensional filters has a total weight equal to a power-of-2 number, the total weight being the sum of respective coefficients.

* * * * *